UNITED STATES PATENT OFFICE.

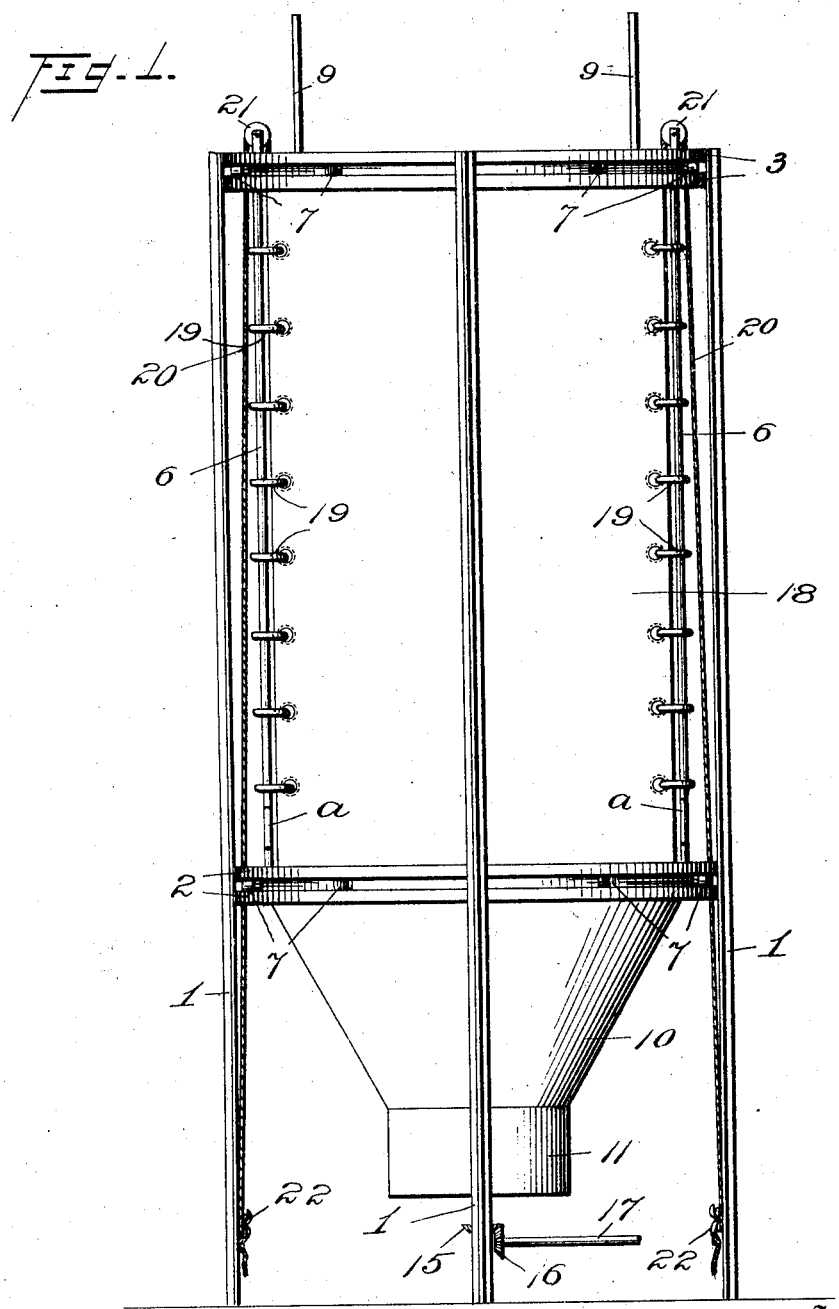

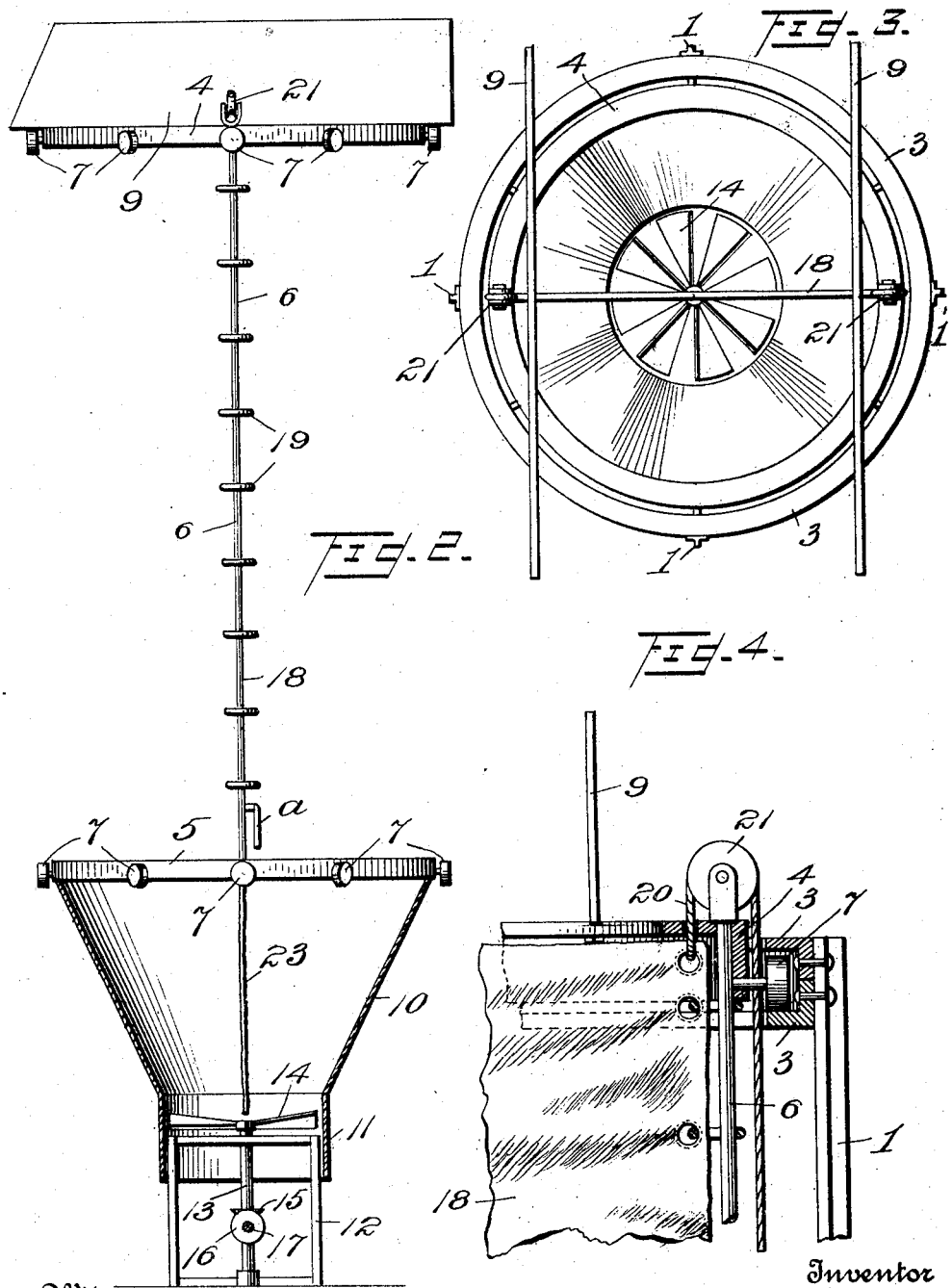

CHARLES E. SHAFFER, OF MORRILL, NEBRASKA.

WIND-MOTOR.

1,003,661.      Specification of Letters Patent.    Patented Sept. 19, 1911.

Application filed January 30, 1911. Serial No. 605,466.

*To all whom it may concern:*

Be it known that I, CHARLES E. SHAFFER, a citizen of the United States, residing at Morrill, in the county of Scotts Bluff and State of Nebraska, have invented certain new and useful Improvements in Wind-Motors, of which the following is a specification.

This invention relates to wind motors and one of the principal objects of the invention is to provide simple, reliable and efficient means for catching the wind and conveying it through a funnel-like inclosure to a rotary wind wheel, thus condensing the current of air and applying it directly to the wind wheel.

Another object of the invention is to provide a wind motor in which all the parts may be readily accessible without having to climb a tower or ladder to reach the operative parts for repairs or oiling.

Still another object of the invention is to provide a canvas sail or sheet to catch the wind and to convey it down through a funnel containing the wind wheel, means being provided for raising and lowering the sail or sheet and means being also provided for presenting the sail or sheet to the wind.

These and other objects may be attained by means of the construction shown in the accompanying drawings, in which:

Figure 1 is a side elevation of a wind motor made in accordance with my invention, the motor being shown in position for use. Fig. 2 is a side elevation and a partial section taken at right angles to Fig. 1 and illustrating the inner frame removed from the tower or outer frame. Fig. 3 is a top plan view of the motor. Fig. 4 is a detailed sectional view showing the manner of mounting the rollers on the inner frame, and showing means for raising and lowering the sail or sheet.

Referring to the drawings, the numerals 1 designate the vertical members of the outer frame or tower, said members being preferably formed of angle irons or T-beams. Secured inside the members 1 at a point some distance from the ground are spaced angle iron rings 2 and at a point near the top similar rings 3 are secured inside the uprights 1.

The framework thus far described forms a support for the operative elements of the motor.

Fitted within the frame to rotate freely therein is a pair of spaced rings 4 and 5 connected together by means of vertical rods 6 at diametrically opposite points. Mounted on the rings 4 and 5 are suitable rollers 7 and these rollers are supported and rotated between the angle irons 2 and 3 secured to the uprights 1. Secured to the ring 4 is a pair of vanes 9, designed for the purpose of rotating the inner frame and holding the same in position to catch the wind. Secured to the lower ring 5 is a tapering funnel-like tube 10 having its lower portion 11 of plane cylindrical form.

Mounted in a suitable frame 12 is a vertical shaft 13 and mounted on the shaft 13 at its upper end is a wind wheel 14. The shaft 13 may be provided with a bevel gear 15 to mesh with a similar gear 16 and a horizontal shaft 17. It will be understood of course that in place of the bevel gears other means like a pulley or sprocket wheel may be resorted to for communicating power to a horizontal shaft.

A canvas sail or sheet 18 is mounted in the inner frame and provided with suitable rings 19 at its opposite edges, said rings being adapted to slide upon the vertical rods 6. For raising and lowering the sail 18, suitable cords or cables 20 are connected to the upper end of the sail and passed over suitable pulleys 21 and down to belaying cleats 22 secured to the uprights 1.

The operation of my invention may be briefly described as follows: When it is desired to operate the motor, the sail 18 is raised to the position shown in Fig. 1 and the wind catches the sail and is conveyed down through the funnel 10 where it is condensed and where it strikes the blades of the wind wheel 14 to rotate the shaft 13. At the lower end of the sail 18 is a flap 23 which is blown to one side by the force of the wind but which serves to confine the wind to one side of the motor as much as possible and thus assist in overcoming a back action or retrograde movement of the wheel. When it is desired to stop the motor, the sail may be readily lowered, and the rings 19 may be engaged by a suitable latch, *a*, on the vertical rods 6 for holding the sail down against a severe wind when it is not desired to operate the motor.

From the foregoing, it will be obvious that a wind motor made in accordance with my invention may be placed at any point desired, will catch the wind coming from any direction, and will convey a current down the funnel-like structure to the wind wheel; that the various parts of the device may be readily accessible for repairs or oiling without climbing a tower or without the use of a ladder.

A wind motor made in accordance with my invention will develop high speed and great power.

I claim:

1. A wind motor comprising an outer frame or support, an inner frame mounted to rotate on the outer frame, a sail connected to said inner frame, a funnel-like tube at the lower end of said inner frame, and a wind wheel located within the lower end of said funnel.

2. A wind motor comprising an outer frame, a rotatable inner frame, a sail connected to said inner frame, vanes connected to said inner frame for holding the sail facing the wind, a funnel at the bottom of said frame, and a wind wheel independently supported within said funnel.

3. A wind motor comprising an outer frame, an inner frame mounted to rotate within the outer frame, a funnel at the lower end of said inner frame, a sail mounted in the inner frame and adapted to be raised and lowered, vanes connected to the inner frame and a wind wheel independently mounted within the funnel.

4. A wind motor comprising an outer frame, a rotatable inner frame carrying a sail, a funnel connected to the inner frame at its lower end, a wind wheel mounted in a frame supported independently of the inner frame, said wind wheel being located within the funnel, means for raising and lowering the sail, the latter being provided with a flap extending into the funnel.

5. A wind motor comprising an outer frame consisting of metal uprights and supporting rings secured thereto, an inner frame comprising rings and vertical rods, rollers mounted on the last mentioned rings and adapted to be supported upon the rings connected to the outer frame, a sail provided with rings at its outer edges mounted to slide upon said rods, cables or cords for raising and lowering said sail, a funnel connected to the lower end of the inner frame, and a wind wheel supported independently within said funnel.

6. A wind motor comprising an outer frame, a rotatable inner frame, a sail carried by the inner frame for catching the wind, means for rotating the inner frame to keep the sail facing the wind, means for concentrating the current of air, and a wind wheel mounted independently at the lower end of the frame.

In testimony whereof I affix my signature in presence of two witnesses.

CHARLES E. SHAFFER.

Witnesses:
 LEWIS K. GLENN,
 C. N. WHIME.